(12) United States Patent
Ryu et al.

(10) Patent No.: US 10,814,918 B2
(45) Date of Patent: Oct. 27, 2020

(54) SUB-FRAME MOUNTING STRUCTURE

(71) Applicants: Hyundai Motor Company, Seoul (KR); Kia Motors Corporation, Seoul (KR); Samjin Jeonggong Co., Ltd., Cheonan, Chungcheongnam-do (KR); Sungwoo Hitech Co., Ltd, Busan (KR)

(72) Inventors: Seho Ryu, Incheon (KR); Yong Kew Kim, Gyeonggi-do (KR); Sea Cheoul Song, Gyeonggi-do (KR); SeungMin Kang, Gyeonggi-do (KR); Sung Sik Park, Ulsan (KR); Suk Ho Choi, Chungcheongnam-do (KR); Tae Hyun Kim, Gyeongsangnam-do (KR); Ki sung Nam, Gyeongsangnam-do (KR); Min Je Lee, Chungcheongnam-do (KR); Sang Eon Park, Gijang-Gun (KR)

(73) Assignees: Hyundai Motor Company, Seoul (KR); Kia Motors Corporation, Seoul (KR); Samjin Jeonggong Co., Ltd., Cheonan, Chungcheongnam-do (KR); Sungwoo Hitech Co., Ltd, Busan (KR)

( * ) Notice: Subject to any disclaimer, the term of this patent is extended or adjusted under 35 U.S.C. 154(b) by 107 days.

(21) Appl. No.: 16/176,496

(22) Filed: Oct. 31, 2018

(65) Prior Publication Data
US 2020/0017149 A1     Jan. 16, 2020

(30) Foreign Application Priority Data

Jul. 12, 2018   (KR) ........................ 10-2018-0080849

(51) Int. Cl.
   *B62D 27/06*   (2006.01)
   *B62D 29/04*   (2006.01)
   *B62D 21/15*   (2006.01)

(52) U.S. Cl.
   CPC ........... *B62D 27/06* (2013.01); *B62D 21/155* (2013.01); *B62D 29/04* (2013.01)

(58) Field of Classification Search
   CPC ....... B62D 27/06; B62D 29/04; B62D 21/155
   See application file for complete search history.

(56) References Cited

U.S. PATENT DOCUMENTS

2010/0072787 A1* 3/2010 Abe .................... B62D 25/087
                                                   296/203.04

* cited by examiner

*Primary Examiner* — Melissa A Black
*Assistant Examiner* — Melissa Ann Bonifazi
(74) *Attorney, Agent, or Firm* — Mintz Levin Cohn Ferris Glovsky and Popeo, P.C.; Peter F. Corless (57) ABSTRACT

A sub-frame mounting structure is provided. The sub-frame mounting structure includes an outer pipe that is mounted on a vehicle body and an inner pipe that is inserted into and coupled to the outer pipe and detached from the outer pipe when an impact load of a predetermined size or greater is transferred thereto. An anti-rotation structure prevents a relative rotation between the inner pipe and the outer pipe. A sub-frame is fastened to the inner pipe to support the vehicle body through the outer pipe to stably support the vehicle body by the sub-frame and to detach the sub-frame from the vehicle body during a collision.

12 Claims, 8 Drawing Sheets

SUB-FRAME MOUNTING STRUCTURE

CROSS-REFERENCE TO RELATED APPLICATION

This application claims priority to and the benefit of Korean Patent Application No. 10-2018-0080849 filed on Jul. 12, 2018, the entire contents of which are incorporated herein by reference.

BACKGROUND

(a) Field of the Invention

The present invention relates to a sub-frame mounting structure, and more particularly, to a sub-frame mounting structure that allows a sub-frame to be separated from a vehicle body when an impact load of a predetermined size or greater is transferred to the sub-frame.

(b) Description of the Related Art

In general, a sub-frame of a vehicle is mounted on a lower portion of a vehicle body, particularly, a lower portion of a side member of the vehicle body to support an engine, a transmission, and the like, and chassis parts are mounted on the sub-frame and supported by the sub-frame. When an impact load is transferred from the vehicle body to the sub-frame during a vehicle collision, the sub-frame is properly detached from the vehicle body to prevent the engine, the transmission, or the like from being pushed toward the interior of the vehicle, thereby improving collision stability of vehicle passengers.

According to the prior art, when the sub-frame is mounted on the vehicle body and an impact load of a predetermined size or greater is transferred to a sub-frame mounting bushing, the sub-frame is separated from the vehicle body while the bushing is detached, or when the impact load of the predetermined size or greater is transferred to a mounting bolt for a sub-frame, the sub-frame is separated from the vehicle body while a portion at which the sub-frame mounting bolt is mounted on the vehicle body is detached from the vehicle body. However, the detachment structure of the bushing or the detachment structure of the sub-frame mounting bolt according to the prior art has disadvantages in that the cost increases and partial damage of the vehicle body occurs.

The above information disclosed in this section is merely for enhancement of understanding of the background of the invention and therefore it may contain information that does not form the prior art that is already known in this country to a person of ordinary skill in the art.

SUMMARY

The present invention provides a sub-frame mounting structure capable of improving collision stability by allowing a sub-frame to be detached from a vehicle body when an impact load of a predetermined size or greater is transferred to a vehicle body portion of the sub-frame, being applied universally regardless of vehicle type, and reducing costs without causing damage to the vehicle body.

An exemplary embodiment of the present invention provides a sub-frame mounting structure that may include an outer pipe mounted on a vehicle body; an inner pipe inserted into and coupled to the outer pipe and detached from the outer pipe when an impact load of a predetermined size or greater is transferred thereto; and an anti-rotation structure that prevents a relative rotation between the inner pipe and the outer pipe, wherein a sub-frame may be fastened to the inner pipe to support the vehicle body through the outer pipe.

The anti-rotation structure may include an anti-rotation coupling portion having a polygonal shape formed on an inner circumference surface of the outer pipe; and a nut portion formed in the polygonal shape on an outer circumference surface of the inner pipe to be coupled to the anti-rotation coupling portion. The outer pipe may include a pipe body in which an aperture that penetrates from one side of the pipe body to the other side thereof is formed; and the anti-rotation coupling portion formed on an inner circumference surface of the pipe body. The inner pipe may include a pipe body in which an aperture that penetrates from one side of the pipe body to the other side thereof is formed; and a nut portion formed on an outer circumference surface of the pipe body and formed in the polygonal shape corresponding to the anti-rotation coupling portion of the outer pipe. The polygonal shape of each of the outer pipe and the inner pipe may be a hexahedral shape.

The sub-frame mounting structure may further include a critical load detachment structure that allows the inner pipe to be detached from the outer pipe when the load of the predetermined size or greater is applied to the inner pipe. The critical load detachment structure may include an inclined supporting portion formed on the outer pipe; and a catching portion formed on the inner pipe to be forcedly swaged and be in close contact with the inclined supporting portion.

The outer pipe may include a pipe body in which an aperture that penetrates from one side of the pipe body to the other side thereof is formed; the inclined supporting portion formed on an upper portion of the pipe body; and the anti-rotation coupling portion formed on a lower portion of the pipe body. The inner pipe may include a pipe body in which an aperture penetrating from one side of the pipe body to the other side thereof is formed; the nut portion formed on a lower portion of the pipe body; and the catching portion formed on an upper portion of the pipe body.

An outer circumference surface of the inner pipe may include a polymer coating. Cutout grooves or one or more cutout portions may be formed in an outer circuit surface of the nut portion. A thickness of the catching portion may be less than the thickness of the nut portion. An assembly bolt that penetrates through the sub-frame may be fastened to the inner pipe.

According to an exemplary embodiment of the present invention, in the sub-frame mounting structure, the outer pipe may be mounted on the vehicle body, and the sub-frame may be mounted on the vehicle body through the inner pipe which is detachably coupled to the outer nut and the mounting bolt fastened to the inner pipe. Therefore, when the impact load of the predetermined load or greater is transferred to the sub-frame, the inner pipe may be detached from the outer pipe to guide a vehicle body detachment of the sub-frame, thereby making it possible to improve collision stability of the vehicle.

When coupling rigidity of the inner pipe and the outer pipe is properly adjusted, since collision detachment rigidity of the sub-frame may be adjusted, the sub-frame mounting structure may be universally applied to all types of vehicles and the costs thereof may also be reduced. Since the sub-frame does not cause the damage to the vehicle body when being detached from the vehicle body, the repair and maintenance cost of the vehicle may be reduced, and since the sub-frame may be stably supported on the vehicle body, the durability and noise vibration harshness (NVH) performance of the vehicle may be improved.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

Figure 1:
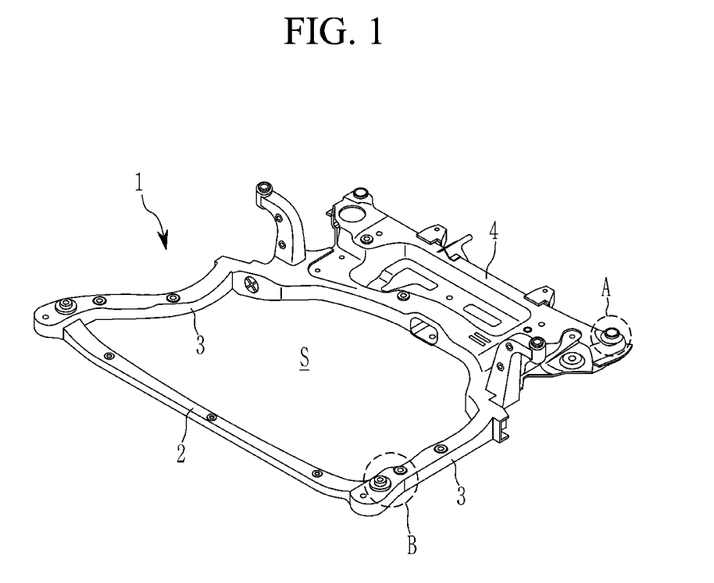
FIG. 1 is a perspective view of a sub-frame to which a mounting structure according to an exemplary embodiment of the present invention is applied.

Referring to FIG. 1, a sub-frame 1 to which a sub-frame mounting structure according to an exemplary embodiment of the present invention is applied may include a lateral frame 2 that extends along a width direction of a vehicle, two longitudinal frames 3 coupled to both end portions of the lateral frame and that extend along a length direction of the vehicle, and a mounting plate 4 to which the two longitudinal frames 3 may be coupled and having a plate shape, respectively.

Additionally, an inner space S of a substantially quadrangular shape may be partitioned by the lateral frame 2, the two longitudinal frames 3, and the mounting plate 4. Front mounting portions A mounted on a vehicle body may be mounted to front portions of the two longitudinal frames 3, and rear mounting portions B mounted on the vehicle body at both left and right sides along the width direction of the vehicle may be disposed on the mounting plate 4. The mounting structure according to an exemplary embodiment of the present invention may be particularly applied to the rear mounting portions A.

Figure 2:
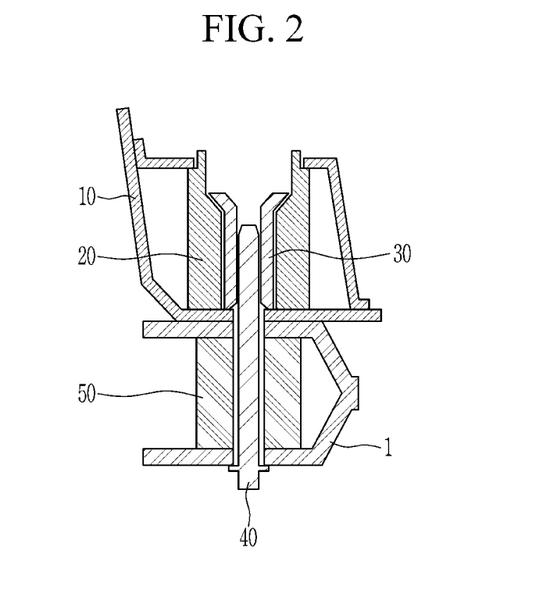
FIG. 2 is a cross-sectional view of a sub-frame mounting structure according to an exemplary embodiment of the present invention.

Referring to FIG. 2, the sub-frame 1 may be detachably fastened to the vehicle body 10 through the mounting structure according to an exemplary embodiment of the present invention. The mounting structure according to an exemplary embodiment of the present invention may include an outer pipe 20 fixedly coupled to the vehicle body 10, an inner pipe 30 detachably coupled to the outer pipe 20, and a mounting bolt 40 that penetrates through the sub-frame and fastened to the inner pipe 30. A bushing 50 may be inserted into and coupled to an outer circumference of the mounting bolt 40. The vehicle body 10 may include a mounting boss 11 and the outer pipe 20 may be inserted into the mounting boss 11 and be fixed coupled thereto by a method such as a welding or the like.

Figure 3:
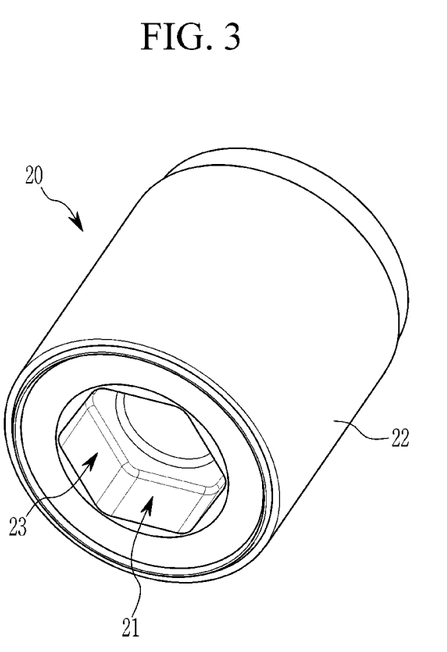
FIG. 3 is a perspective view of an outer pipe of the sub-frame mounting structure according to an exemplary embodiment of the present invention.
Figure 5:
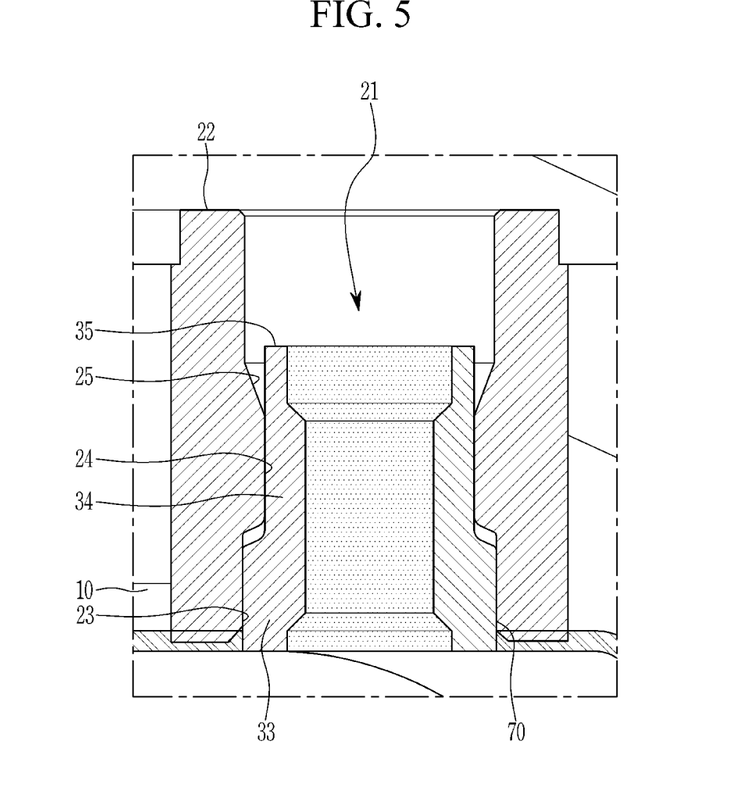
FIG. 5 is a cross-sectional view of a preliminarily assembled state of the inner pipe and the outer pipe of the sub-frame mounting structure according to an exemplary embodiment of the present invention.

Referring to FIGS. 3 and 5, the outer pipe 20 may include a pipe body 22 in which an aperture 21 may penetrate from a first side of the outer pipe 20 to a second side thereof. An inner side of the pipe body 22 may include anti-rotation coupling portions 23 of a polygonal shape, preferably, a hexagonal shape, supporting portions 24 that extend from the anti-rotation coupling portions 23, and inclined supporting portions 25 inclined from an inner diameter direction to an outer diameter direction. An inner diameter of the supporting portion 24 may be less than those of the anti-rotation coupling portion 23 and the inclined supporting portion 25.

Figure 4A:
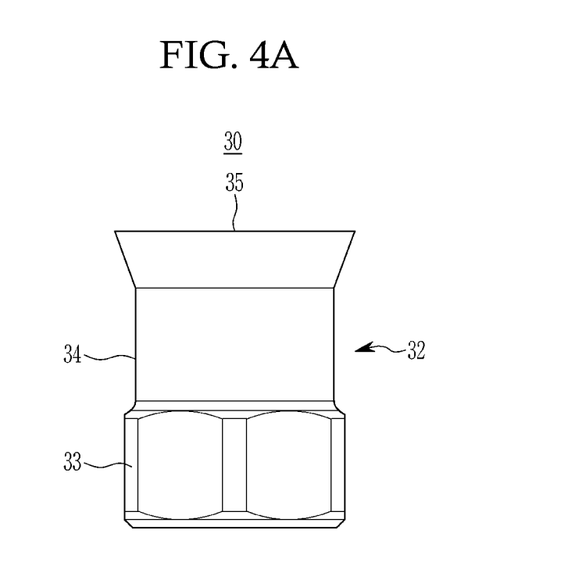
FIGS. 4A and 4B show a front view and a plan view of an inner pipe of the sub-frame mounting structure according to an exemplary embodiment of the present invention.
Figure 4B:
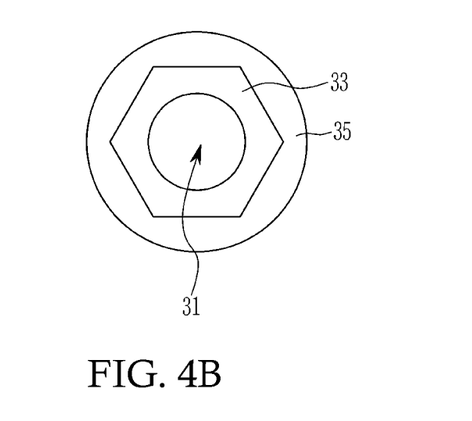
Figure 6:
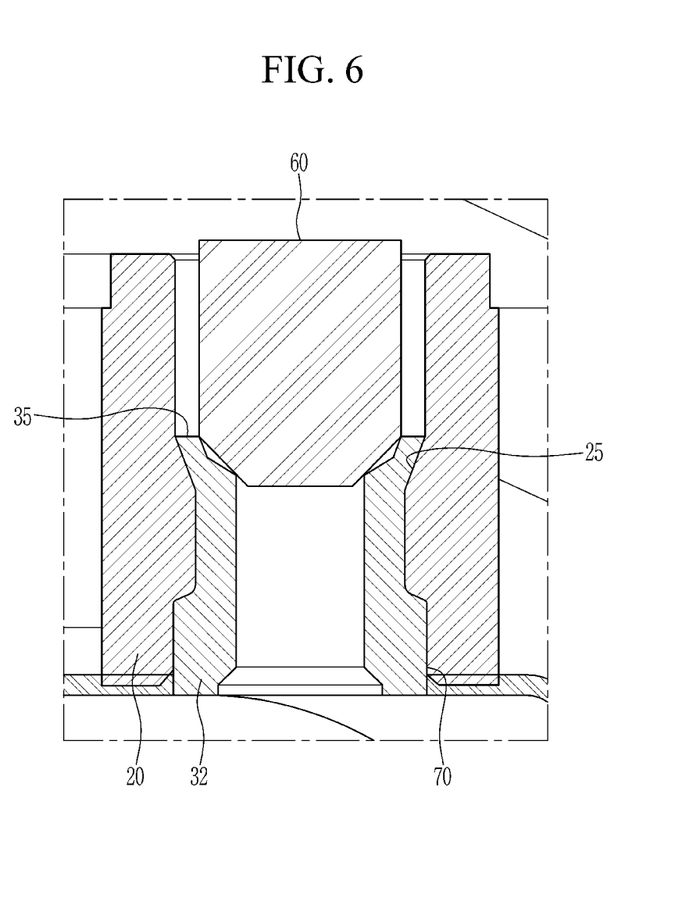
FIG. 6 is a cross-sectional view of a completely assembled state of the inner pipe and the outer pipe of the sub-frame mounting structure according to an exemplary embodiment of the present invention.

Referring to FIGS. 4A-4B and 5, the inner pipe 30 may include a pipe body 32 in which an aperture 31 may penetrate from a first side of the inner pipe 30 to a second side thereof, nut portions 33 formed on an outer circumference surface of the pipe body 32, formed in a polygonal shape, for example, a hexahedral shape corresponding to the shape of the anti-rotation coupling portions 23 of the outer pipe 20, and forcedly inserted into the anti-rotation coupling portions 23, extending portions 34 that extend from the nut portions 33 and inserted into the supporting portions 24 of the outer pipe 20, and catching portions 35 inserted into and coupled to the outer pipe 20, then forcedly swaged through a punch 60 as illustrated in FIG. 6, and brought into close contact with (e.g., abutting contact) the inclined supporting portions 25 of the outer pipe 20, respectively.

A screw portion may be formed on an inner circumference surface of the nut portion 33 to fasten the assembly bolt 40 thereto. A thickness of the catching portion 35 may be less than those of the nut portion 33 and the extending portion 34 and thus, the nut portion 35 may have a structure in which rigidity thereof is weaker than that of the nut portion 33 and the extending portion 34.

The anti-rotation coupling portions of the outer pipe and the nut portions of the inner pipe may form an anti-rotation structure that prevents a relative rotation. The catching portions of the inner pipe and the inclined supporting portions of the outer pipe may form a critical load detachment structure. When the inner pipe 30 is inserted into and coupled to the aperture 21 of the outer pipe 20, a polymer coating 70 may be provided on an outer circumference surface of the inner pipe 30 to prevent foreign material such as moisture from flowing between the inner pipe 30 and the aperture 21 to corrode the inner pipe 30 and the aperture 21.

Figure 7:
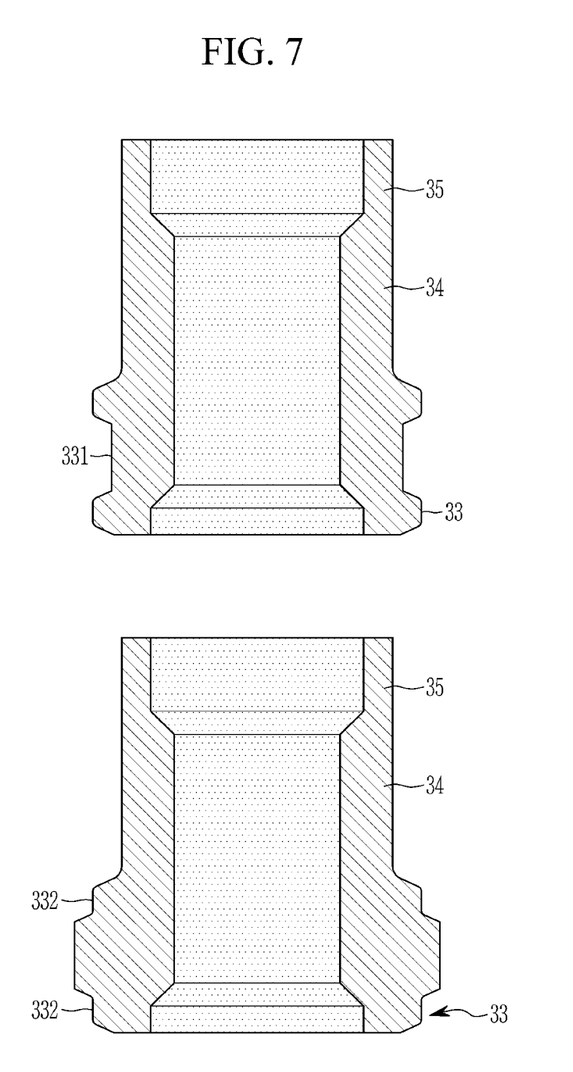
FIG. 7 is a cross-sectional view illustrating a modification of the inner pipe according to an exemplary embodiment of the present invention.

Meanwhile, as illustrated in FIG. 7, since a load of forcedly pressing force may be adjusted by changing a shape of the nut portion 33, cutout grooves 331 may be formed by cutting intermediate portions of the nut portions 33 to reduce a forcedly pressing area, or cutout portions 332 may be formed by cutting upper and lower portions of the nut portions 33 except for the intermediate portions of the nut portions 33 to reduce the forcedly pressing area. Accordingly, the load of the forcedly pressing force may be reduced and a manufacturing diffusion may also be absorbed. An interior material such as a foam may be inserted into the cutout grooves 331 or the cutout portions 332 to fill empty spaces thereof.

Figure 8:
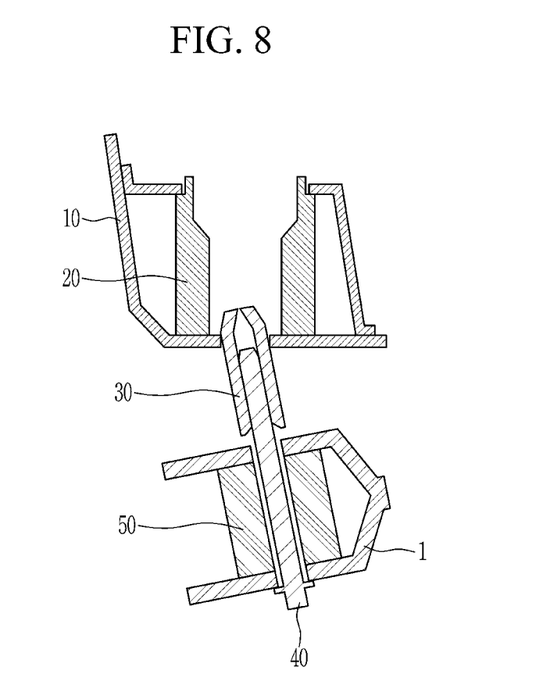
FIG. 8 is a cross-sectional view describing a behavior in which a sub-frame is detached from a vehicle body when an impact load is transferred to the sub-frame mounting structure according to an exemplary embodiment of the present invention in a state in which the sub-frame is mounted on the vehicle body.

Referring to FIG. 8, when the inner pipe 30 is forcedly inserted into the outer pipe 20 to assemble the sub-frame 1 with the vehicle body 10, the nut portions 33 of the inner pipe 30 may be pressed into the anti-rotation coupling portions 23 of the outer pipe 20 and thus, the sub-frame 1 may be prevented from detaching from the vehicle body 10. In addition, due to the shape of the nut portions 33 and the shape of the anti-rotation coupling portions 23, that is, shape characteristics of the nut portion 33 and the anti-rotation coupling portions 23 which are in face-to-face contact with each other, the inner pipe 30 may be coupled to the outer pipe 20 to prevent rotation with respect to the outer pipe 20.

In this state, when the catching portions 35 of the inner pipe 30 are swaged using the punch 60, since the catching portions 35 are supported when abutting the inclined supporting portions 25 of the outer pipe 20, a relative rotation and an axial detachment may be prevented when the inner pipe 30 is forcedly coupled to the outer pipe 20. Subsequently, when the assembly bolts 40 are assembled to penetrate through the sub-frame 1 and then screwed together with the screw portions formed on the inner circumference surface of the nut portions 33 of the inner pipe 30, the sub-frame 1 may be stably fastened and supported by the inner pipe 30 and the outer pipe 20 with respect to the vehicle body 10.

When the sub-frame 1 is mounted on the vehicle body 10, for example, a side member in the mounting structure according to an exemplary embodiment of the present invention as described above, when a collision occurs and an impact thereof is transferred to the mounting structure through the sub-frame 1, the catching portions 35 of the inner pipe 30, which are portions of the mounting structure having the weakest rigidity, receive the impact load and may be detached from the outer pipe 20 while the swaged portions thereof may be reduced. Accordingly, the sub-frame 1 may also be detached from the vehicle body 10, thereby improving collision stability of the vehicle.

Since the thicknesses of the catching portions 35 may be appropriately adjusted and the sub-frame 1 may be detached from the vehicle body 10 only when an impact load of a predetermined size or greater is transferred to the sub-frame 1 while supporting the vehicle body during the driving of the vehicle, detachment rigidity of the sub-frame 1 may be designed more easily, the sub-frame mounting structure may be applied universally to all types of vehicles regardless of sub-frame type, and rigidity and durability of the vehicle body may also be improved by the stable vehicle body supported by the sub-frame.

As described above, although the present invention has been described with reference to the exemplary embodiments and the accompanying drawings, it would be appreciated by those skilled in the art that the present invention is not limited thereto but various modifications and alterations might be made without departing from the scope defined in the claims and their equivalents.

DESCRIPTION OF SYMBOLS

A: front mounting portion
1: side member
10: vehicle body
20: outer pipe
21: aperture
22: pipe body
23: anti-rotation coupling portion
24: supporting portion
25: inclined supporting portion
30: inner pipe
31: aperture
32: pipe body
33: nut portion
34: extending portion
35: catching portion
40: assembly bolt
50: bushing
60: punch
70: polymer coating

What is claimed is:

1. A sub-frame mounting structure, comprising:
    an outer pipe mounted on a vehicle body;
    an inner pipe inserted into and coupled to the outer pipe and detached from the outer pipe when an impact load of a predetermined size or greater is transferred thereto,
    wherein a sub-frame is fastened to the inner pipe to support the vehicle body through the outer pipe; and
    an anti-rotation structure that prevents a relative rotation between the inner pipe and the outer pipe,
    wherein the anti-rotation structure includes:
        an anti-rotation coupling portion having a polygonal shape formed on an inner circumference surface of the outer pipe; and
        a nut portion formed in the polygonal shape on an outer circumference surface of the inner pipe to be coupled to the anti-rotation coupling portion.

2. The sub-frame mounting structure of claim 1, wherein the outer pipe includes:
    a pipe body in which an aperture that penetrates from a first side of the pipe body to a second side thereof is formed, wherein the anti-rotation coupling portion is formed on an inner circumference surface of the pipe body.

3. The sub-frame mounting structure of claim 1, wherein the inner pipe includes:
   a pipe body in which an aperture that penetrates from a first side of the pipe body to a second side thereof is formed; and
   a nut portion formed on an outer circumference surface of the pipe body and formed in the polygonal shape corresponding to the anti-rotation coupling portion of the outer pipe.

4. The sub-frame mounting structure of claim 2, wherein the polygonal shape of each of the outer pipe and the inner pipe is a hexahedral shape.

5. The sub-frame mounting structure of claim 1, further comprising:
   a critical load detachment structure that allows the inner pipe to be detached from the outer pipe when the load of the predetermined size or greater is applied to the inner pipe.

6. The sub-frame mounting structure of claim 5, wherein the critical load detachment structure includes:
   an inclined supporting portion formed on the outer pipe; and
   a catching portion formed on the inner pipe to be forcedly swaged and to abut the inclined supporting portion.

7. The sub-frame mounting structure of claim 6, wherein the outer pipe includes:
   a pipe body in which an aperture that penetrates from a first side of the pipe body to a second side thereof is formed,
   wherein the inclined supporting portion is formed on an upper portion of the pipe body, and
   wherein the anti-rotation coupling portion is formed on a lower portion of the pipe body.

8. The sub-frame mounting structure of claim 6, wherein the inner pipe includes:
   a pipe body in which an aperture that penetrates from a first side of the pipe body to a second side thereof is formed,
   wherein the nut portion is formed on a lower portion of the pipe body, and
   wherein the catching portion is formed on an upper portion of the pipe body.

9. The sub-frame mounting structure of claim 1, wherein:
an outer circumference surface of the inner pipe is provided with a polymer coating.

10. The sub-frame mounting structure of claim 9, wherein cutout grooves or one or more cutout portions are formed in an outer circuit surface of the nut portion.

11. The sub-frame mounting structure of claim 9, wherein a thickness of the catching portion is less than the thickness of the nut portion.

12. The sub-frame mounting structure of claim 1, wherein an assembly bolt that penetrates through the sub-frame is fastened to the inner pipe.

* * * * *